Patented Aug. 10, 1948

2,446,864

UNITED STATES PATENT OFFICE 2,446,864

COMPOSITION AND PROCESS FOR IMPARTING DURABLE WATER REPELLENT FINISH TO TEXTILES

Ellis Abrams, Philadelphia, Pa., assignor to Quaker Chemical Products Corp., Conshohocken, Pa., a corporation of Pennsylvania No Drawing. Application June 26, 1944, Serial No. 542,240

12 Claims. (Cl. 260—33.6)

The invention relates to compositions and processes for imparting durable water repellent finishes to textile materials and includes textile materials so treated.

An object of this invention is to impart water repellency to textile fibers and more particularly to cellulosic fibers or fabrics.

A further object is to provide a water repellent finish which is highly resistant to wet scouring operations and to dry cleaning treatments.

It is also an object to render fibers water repellent throughout a fabric rather than merely at the surface of the fabric.

A further object is to render fabrics and fibers water repellent without simultaneously tendering the fibers as occurs with other types of durable water repellents.

Other objects and advantages of the invention will become apparent as the following detailed description progresses.

I have discovered that the above objects and advantages may be accomplished by impregnating textile materials such as cotton, wool, silk or the like with a fluid dispersion of a mixture of a substituted urea and an amine or amide aldehyde resin of the type hereinafter described.

Suitable substituted ureas are those having the formula RNH—CO—NHR$_1$ where R represents a saturated or unsaturated aliphatic radical containing 12 or more carbon atoms and R$_1$ represents either a hydrogen atom, or a saturated or unsaturated aliphatic radical containing one or more carbon atoms, or an aromatic or substituted aromatic radical. Such compounds include dodecyl urea, tetradecyl urea, octadecyl urea, octadecenyl urea, sym-di-dodecyl urea, sym-di-heptadecyl urea, sym-di-octadecyl urea, N-butyl-N'-hexadecyl urea, N-dodecyl-N-octadecyl urea, N-phenyl-N'-octadecyl urea, N-(p-methyl phenyl)-N'-tetradecyl urea, and N-(p-phenyl phenyl)-N'-dodecyl urea among others.

Suitable amine or amide aldehyde resins are the amine or amide aldehyde resins (generally the intermediate stage resins) which are soluble in organic solvents and are of the type exemplified by the solvent soluble urea formaldehyde resins, urea acetaldehyde resins, urea crotonaldehyde resins, melamine formaldehyde resins, melamine acetaldehyde resins, melamine crotonaldehyde resins, mixed urea melamine aldehyde resins; aniline formaldehyde resins, and other solvent soluble aniline aldehyde resins; guanidine formaldehyde resins, and other guanidine aldehyde resins; dicyandiamide formaldehyde resins and the like.

The relative proportion of substituted urea to amine or amide aldehyde resin above described is not critical. In general, the incorporation of the amine or amide aldehyde resins with the substituted urea gives superior results from the point of view of durable water repellency over that obtained with either material alone. The substituted ureas embraced in this invention, especially the higher alkyl ureas, exhibit very high cohesive forces in their films, and when a dispersion containing a higher substituted urea is applied directly to textile fibers, the substituted urea molecules are readily oriented so that the hydrophilic portion is closest to the fiber. By using the amine or amide aldehyde resin in the dispersion with the substituted urea it is believed that the polar heads are firmly cemented to the fiber, and that the similarity in structure between the basic units of the amine or amide aldehyde resin and the polar portion of the substituted urea allows for intimate compatibility and penetration into the resin network. On heating the composition to effect a cure, the composite finish is then virtually as permanent as would be the cured amine or amide aldehyde resin alone.

The mixture of substituted urea and amine or amide aldehyde resin may be applied to the textile fibers or fabrics either in the form of a solution in an organic solvent or in the form of an emulsion. The preferred manner of applying the composition is by means of an emulsion.

In accordance with one embodiment of the invention, the substituted urea and amine or amide aldehyde resin are dispersed in a mixture of an aromatic solvent and a polar solvent, together with a small proportion of an emulsifying agent to form a thick paste. Any type of emulsifier adapted to form an oil in water emulsion may be used but I prefer to use emulsifying agents which decompose on heating to leave a hydrophobic residue. Suitable emulsifying agents include the reaction product of morpholine and oleic acid, or other higher fatty acids. Other volatile amines are ethylene diamine, dimethylethanolamine, propylenediamine, and pyridine. The utility of such emulsifying agents is based on the fact that the amine is volatile at the curing temperature of the water repellent finish and this volatile amine portion of the emulsifier evaporates, thus decomposing the emulsifier and increasing the permanency of the finish.

The above described thick paste comprising the substituted urea, amine or amide aldehyde resin, solvent, and emulsifier is in a form particularly suitable for sale and shipment to a textile treating establishment. The user simply heats the paste with water until the paste is in a molten condition and forms the emulsion with agitation. Preferably a small proportion of ammonium hydroxide or other alkali is added to aid the formation of a suitable dispersion.

Various types of fabrics such as cotton, wool, or silk may be padded through the hot emulsion with the rolls adjusted so that a pickup equal to the weight of the cloth is obtained, or applied in any other manner to effect a similar deposit on the fabric. Preferably conditions are adjusted so that a dry pickup of 6–12% (depending on the fabric) is obtained. The fabric is then dried and heated at a temperature and time sufficient to cure the amine or amide formaldehyde resin, for example, from 120–170° C. from 3–10 minutes.

The baking or curing treatment is essential for the realization of permanent water repellent properties. Water repellent effects are apparent after baking for 10 minutes at 75° C., but best results are obtained when the curing range is 120–170° C. The duration of the baking treatment varies with the temperature and weight of fabric. Shorter baking periods can be used at higher temperatures. For example, applying an emulsion of sym-ditetradecyl urea to five ounce poplin fabric, one must bake at 120° C. for five minutes or at 170° C. for 2 minutes. The baking temperature and time should be lower than that at which tendering occurs.

Applications made in accordance with this invention enable the operator to obtain samples almost completely free of tendering. Whereas with the quaternary salt type of durable water repellent free acid is liberated during the baking operation, no materials objectionable to the fibers are liberated in this process. Furthermore, with the use of quaternary salts the cloth must be completely dried at a relatively low temperature prior to the baking operation. This is particularly time consuming and costly. Fabrics treated in accordance with this invention may be cured without going through a careful preliminary drying stage, thus enabling higher running speeds and lower production costs. Also, in the case of the quaternary salts it is necessary to give the treated fabrics a light scouring operation following the baking period. This is to remove residual salts and acid, and unreacted materials. This operation and the subsequent necessary drying operation are not necessary for materials treated according to the principles described.

Instead of using an emulsion of the substituted urea and the amine or amide aldehyde resin, these materials may be dissolved in an organic solvent such as, for example, trichloroethylene, preferably containing a small proportion of acetic acid. Other suitable solvents are xylene, butanol, diethylene glycol monobutyl ether, ethylene glycol monobutyl ether, and the like. The warm solution is padded on the cloth or fiber which is then cured in the usual manner for curing the amine or amide aldehyde resin.

To more clearly set forth the practice in accordance with the invention and to more specifically point out the nature of the product and process contemplated thereby, several specific, illustrative examples are hereinafter set forth, it being understood that these examples illustrate embodiments which have given satisfactory results and are not intended to restrict the invention thereto. The proportions where not otherwise indicated are in parts or percentages by weight.

Example I

Thirty parts of sym-ditetradecyl urea, prepared by heating tetradecyl amine and urea at 150° C. for several hours, were heated until in a molten condition. To this was added 32 parts of xylene and 15 parts butanol. Fourteen parts of solvent soluble urea formaldehyde resin were then added and finally 9 parts of morpholine oleate. On cooling, the mixture set to a thick paste.

The emulsion was prepared by adding 15 parts of the above mixture to 82 parts of water and heating the mixture to 85–90° C. Three parts of commercial ammonium hydroxide were then added and the mixture was agitated until a milky emulsion was formed. Stirring was continued until the emulsion cooled to 50° C. Cotton sheeting was then padded through the solution at 50° C. with the rolls adjusted so the cloth picked up its own weight of liquid. The fabric was then baked at 120–150° C. for several minutes. The water repellent finish then showed exceptional resistance to scouring and dry cleaning.

Example II

To 25 parts of molten N-phenyl-N'-octadecyl urea were added in the following order 12 parts of ethylene glycol monoethyl ether, 39 parts of xylene, 14 parts of a solvent soluble melamine formaldehyde resin and 9 parts of morpholine oleate. The mixture set to a thick paste when cooled. The emulsion was prepared and used as described in Example I. When applied to a 7 ounce cotton gabardine cloth, the cloth was given a water repellent finish which withstood repeated scouring with hot soap solution.

Example III

To 15 parts of molten N-dodecyl-N'-octadecyl urea were added 8 parts of butanol, 15 parts of xylene, 5 parts of ammonium linoleate, and 5 parts of a mixed melamine urea formaldehyde resin. An emulsion was prepared as described in Example I. This solution was applied to a tackle twill and after passing through the squeeze rolls the cloth was cured at 150° C. for 3 minutes. The water repellent property confined upon the fabric is resistant to repeated dry cleaning and scouring operations.

Example IV

To 15 parts of sym-dioctadecyl urea in a molten were added 8 parts of butanol, 17 parts of xylene, 7 parts of solvent soluble melamine formaldehyde resin containing 50% solids, and 9 parts of morpholine oleate. To 15 parts of this mixture heated to a liquid condition were added at 160° F. 85 parts of a solution containing 3 parts of commercial ammonium hydroxide and 82 parts of water. The mixture was agitated until the temperature fell to 120° F., at which temperature the emulsion was applied to various types of fabric. The type of fabric did not appreciably affect the efficacy of the product.

A sample of 5 ounce poplin cloth was padded through the emulsion so that a dry pickup of 7–8% was achieved. The cloth was cured at 140° C. for 4 minutes. The water repellent effect was remarkably resistant to repeated scouring and dry cleaning operations. The effect was further enhanced if to the emulsion was added a small proportion of a water soluble urea or melamine formaldehyde resin.

The formula for producing the thick paste for use in preparing the emulsion may be varied widely. In general, it is preferred to keep the formula within the following approximate ranges:

| | Per cent |
|---|---|
| Substituted urea | 15–40 |
| Solvent type amine or amide formaldehyde resin | 5–20 |
| Butanol | 10–35 |
| Xylene | 15–40 |
| Morpholine | 1–5 |
| Oleic acid | 2–15 |

Other solvents may be substituted for xylene—benzene, toluene, and certain commercial aliphatic-aromatic fractions recovered by the petroleum industry and boiling over the range 100–200° C.; such solvents are Solvesso Nos. 2 and 3, and Apcosol.

The use of a polar solvent such as butanol is necessary for a fluid emulsion. Ethylene glycol monoethyl ether, diethylene glycol monoethyl ether, 2-methyl-2,4-pentanediol, etc., may be used. In the absence of the polar solvent a thick viscous water in oil emulsion is obtained.

Example V

To 6 parts of molten octadecyl urea were added 90 parts of trichloroethylene, 3 parts of a solvent soluble urea formaldehyde resin, and preferably 1 part of glacial acetic acid, or other soluble acetic material which acts as a catalyst. Cotton sheeting was padded through the solution at 140° F. so that the cloth picked up its own weight of solution. The cloth was then cured at 150° C. for 3 minutes. The resultant water repellent effect was resistant to repeated scouring and dry cleaning treatments. Other solvent such as butanol, xylene, diethylene glycol monoethyl ether, may be used.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

I claim:

1. A composition particularly adapted for rendering textile material water repellent comprising a substituted urea having the formula $$RNH—CO—NHR_1$$

where R represents an aliphatic hydrocarbon radical containing at least twelve and not more than eighteen carbon atoms and $R_1$ represents a substituent selected from the group consisting of hydrogen and a hydrocarbon radical; and a resin soluble in an organic solvent selected from the group consisting of urea aldehyde and melamine aldehyde condensation products.

2. A composition particularly adapted for rendering textile material water repellent comprising a substituted urea having the formula $$RNH—CO—NHR_1$$

where R represents an aliphatic hydrocarbon radical containing at least twelve and not more than eighteen carbon atoms and $R_1$ represents a substituent selected from the group consisting of hydrogen and a hydrocarbon radical; and a resin soluble in an organic solvent selected from the group consisting of urea aldehyde and melamine aldehyde condensation products, the substituted urea being present in greater proportion by weight than said resin.

3. A composition particularly adapted for rendering textile material water repellent comprising a mixture of a substituted urea having the formula $RNH—CO—NHR_1$ where R represents an aliphatic hydrocarbon radical containing at least twelve and not more than eighteen carbon atoms and $R_1$ represents a substituent selected from the group consisting of hydrogen and a hydrocarbon radical; and a melamine formaldehyde resin.

4. A composition particularly adapted for rendering textile material water repellent comprising a mixture of a substituted urea having the formula $RNH—CO—NHR_1$ where R represents an aliphatic hydrocarbon radical containing at least twelve and not more than eighteen carbon atoms and $R_1$ represents a substituent selected from the group consisting of hydrogen and a hydrocarbon radical; and a urea formaldehyde resin.

5. A composition of matter comprising a mixture of a substituted urea having the formula $RNH—CO—NHR_1$ where R represents an aliphatic hydrocarbon radical containing at least twelve and not more than eighteen carbon atoms and $R_1$ represents a substituent selected from the group consisting of hydrogen and a hydrocarbon radical; a resin soluble in an organic solvent selected from the group consisting of urea aldehyde and melamine aldehyde condensation products, and an organic solvent for said resin.

6. A composition of matter comprising a mixture of a substituted urea having the formula $RNH—CO—NHR_1$ where R represents an aliphatic hydrocarbon radical containing at least twelve and not more than eighteen carbon atoms and $R_1$ represents a substituent selected from the group consisting of hydrogen and a hydrocarbon radical; a resin soluble in an organic solvent selected from the group consisting of urea aldehyde and melamine aldehyde condensation products, and a water soluble organic solvent.

7. A composition of matter comprising a mixture of a substituted urea having the formula $RNH—CO—NHR_1$ where R represents an aliphatic hydrocarbon radical containing at least twelve and not more than eighteen carbon atoms and $R_1$ represents a substituent selected from the group consisting of hydrogen and a hydrocarbon radical; a resin soluble in an organic solvent selected from the group consisting of urea aldehyde and melamine aldehyde condensation products, a hydrocarbon solvent, and a water soluble organic solvent.

8. A composition of matter comprising a mixture of a substituted urea having the formula $RNH—CO—NHR_1$ where R represents an aliphatic hydrocarbon radical containing at least twelve and not more than eighteen carbon atoms and $R_1$ represents a substituent selected from the group consisting of hydrogen and a hydrocarbon radical; a resin soluble in an organic solvent selected from the group consisting of urea aldehyde and melamine aldehyde condensation products, a hydrocarbon solvent, a water soluble organic solvent and an emulsifying agent.

9. The process of rendering textile material water repellent which comprises impregnating textile material in a fluid dispersion comprising a substituted urea having the formula $$RNH—CO—NHR_1$$

where R represents an aliphatic hydrocarbon radical containing at least twelve carbon atoms and $R_1$ represents a substituent selected from the group consisting of hydrogen and a hydrocarbon radical; and a resin selected from the group consisting of urea aldehyde and melamine aldehyde condensation products, and curing the said resin.

10. A textile material having a water repellent finish comprising a substituted urea having the formula RNH—CO—NHR$_1$ where R represents an aliphatic hydrocarbon radical containing at least twelve carbon atoms and $R_1$ represents a substituent selected from the group consisting of hydrogen and a hydrocarbon radical; and a resin selected from the group consisting of urea aldehyde and melamine aldehyde condensation products.

11. A composition particularly adapted for rendering textile material water repellent comprising a dispersion in a hydrocarbon solvent and a water soluble organic solvent of a substituted urea having the formula RNH—CO—NHR$_1$, where R represents an aliphatic hydrocarbon radical containing at least twelve and not more then eighteen carbon atoms and $R_1$ represents a substituent selected from the group consisting of hydrogen and hydrocarbon radicals; and an organic solvent soluble urea aldehyde resin.

12. A composition particularly adapted for rendering textile material water repellent comprising a dispersion in a hydrocarbon solvent and a water soluble organic solvent of a substituted urea having the formula RNH—CO—NHR$_1$, where R represents an aliphatic hydrocarbon radical containing at least twelve and not more than eighteen carbon atoms and $R_1$ represents a substituent selected from the group consisting of hydrogen and hydrocarbon radicals; and a urea formaldehyde condensation product soluble in an organic solvent, the substituted urea being present in greater proportion by weight than said urea formaldehyde.

ELLIS ABRAMS.

REFERENCES CITED

The following references are of record in the file of this patent:

UNITED STATES PATENTS

| Number | Name | Date |
|---|---|---|
| 2,165,265 | Hubert | July 11, 1939 |
| 2,248,696 | Cassel (1) | July 8, 1941 |
| 2,275,008 | Coffman | Mar. 3, 1942 |
| 2,342,641 | Cassel (2) | Feb. 29, 1944 |
| 2,344,926 | Thackston | Mar. 21, 1944 |
| 2,346,041 | Morgan | Apr. 4, 1944 |
| 2,357,273 | Thurston | Aug. 29, 1944 |